United States Patent
Tsuda et al.

(10) Patent No.: US 6,541,552 B1
(45) Date of Patent: Apr. 1, 2003

(54) AQUEOUS-DISPERSING COMPOSITION OF SYNTHETIC RESIN AND SILICATE OLIGOMER

(75) Inventors: Nobuhiko Tsuda, Settsu (JP); Katsuhiko Imoto, Settsu (JP); Nobuo Mitsuhata, Settsu (JP); Masaru Nagato, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/554,500
(22) PCT Filed: Oct. 23, 1998
(86) PCT No.: PCT/JP98/04824
§ 371 (c)(1), (2), (4) Date: May 16, 2000
(87) PCT Pub. No.: WO99/25781
PCT Pub. Date: May 27, 1999

(30) Foreign Application Priority Data

Nov. 18, 1997 (JP) ................................................ 9-317380

(51) Int. Cl.$^7$ ................................................ C08L 5/24
(52) U.S. Cl. ................ 524/261; 524/267; 524/265; 524/243; 524/545; 525/100; 260/33.4 F; 260/29.6 F; 428/335
(58) Field of Search ..................... 524/261, 267, 524/545, 265, 243; 428/335; 260/33.4 F, 29.6 F; 525/100

(56) References Cited

U.S. PATENT DOCUMENTS

| | | | | |
|---|---|---|---|---|
| 3,644,260 A | * | 2/1972 | Strolle | 428/422 |
| 5,248,714 A | * | 9/1993 | Yamaguchi et al. | 252/182.2 |
| 5,895,713 A | * | 4/1999 | Miyazaki et al. | 106/287.1 |
| 6,075,110 A | * | 6/2000 | Mohri et al. | 528/14 |
| 6,271,293 B1 | * | 8/2001 | Karuga et al. | 524/265 |

FOREIGN PATENT DOCUMENTS

| | | |
|---|---|---|
| JP | 61-258852 | 11/1986 |
| JP | 6-145453 | 5/1994 |
| JP | 8-12922 | 1/1996 |
| JP | 8-231856 | 9/1996 |
| JP | 10-110078 | 4/1998 |
| JP | 10-152646 | 6/1998 |
| JP | 10-168382 | 6/1998 |
| WO | WO 96/26254 | 8/1996 |

* cited by examiner

Primary Examiner—David W. Wu
Assistant Examiner—Henry Hu
(74) Attorney, Agent, or Firm—Armstrong, Westerman & Hattori, LLP

(57) ABSTRACT

To provide the aqueous-dispersing composition of synthetic resin which is excellent in stain-proofing property, weather resistance and storage stability and is capable of forming a coating film having a high gloss. The aqueous-dispersing composition of synthetic resin comprises an aqueous dispersion of synthetic resin and a condensate of tetrafunctional silicate compound represented by the formula (I):

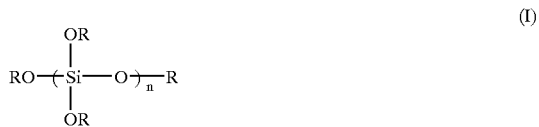

wherein R comprises $R^1$ ($R^1$ is methyl and/or ethyl) and $R^2$ ($R^2$ is at least one linear or branched alkyl group having 3 to 10 carbon atoms), n is 2 to 15, and contains the condensate of tetrafunctional silicate compound in an amount of 1 to 100 parts by weight on the basis of 100 parts by weight of solid content in the aqueous dispersion of synthetic resin.

12 Claims, No Drawings

AQUEOUS-DISPERSING COMPOSITION OF SYNTHETIC RESIN AND SILICATE OLIGOMER

TECHNICAL FIELD

The present invention relates to an aqueous-dispersing composition of synthetic resin which is excellent in stain-proofing property, weather resistance and storage stability and further is capable of forming a coating film having a high gloss, a coating composition comprising the aqueous-dispersing composition and a coated article coated with the coating composition.

BACKGROUND ART

An attempt to improve stain-proofing property and weather resistance by adding a silicate compound to an aqueous coating or paint has been already known.

For example, JP-A-5-170909, WO95/02462 and JP-A-8-259892 disclose coating compositions prepared by adding an alkylsilicate compound to an aqueous emulsion paint. The silicate compounds disclosed in those publications have an alkyl group having 1 to 10 carbon atoms, and when the number of carbon atoms is as small as 1 or 2, hydrolization speed is fast, and therefore an effect of stain-proofing property appears earlier and the effect itself is larger, but on the contrary, they have a drawback that storage stability is very poor in case of an aqueous paint. On the other hand, in order to inhibit hydrolization in water and improve storage stability, use of a silicate compound having an alkyl group having three or more carbon atoms has been proposed, but there was a problem that sufficient stain-proofing effect could not be obtained.

An object of the present invention is to provide an aqueous-dispersing composition of synthetic resin being capable of giving a coating composition for aqueous paint which assures very small adherence of outdoor stains, can form a coating film having a high gloss and is excellent in weather resistance and storage stability.

DISCLOSURE OF INVENTION

The present invention relates to the aqueous-dispersing composition of synthetic resin which comprises an aqueous dispersion of synthetic resin and a condensate of tetrafunctional silicate compound represented by the formula (I):

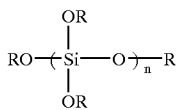

wherein R represents $R^1$ and $R^2$, in which $R^1$ is methyl and/or ethyl and $R^2$ is at least one linear or branched alkyl having 3 to 10 carbon atoms, n is 2 to 15, and contains 1 to 100 parts by weight of the condensate of tetrafunctional silicate compound on the basis of 100 parts by weight of solid content in the aqueous dispersion of synthetic resin.

With respect to the condensate of tetrafunctional silicate compound represented by the formula (I) (hereinafter referred to as "silicate condensate (I)"), a proportion of $R^1$ to the whole R is preferably from 5 to 98% by mole. Further it is preferable that $R^2$ is propyl and/or butyl. Also it is preferable to use a fluorine-containing resin as a synthetic resin.

The above-mentioned aqueous-dispersing composition of synthetic resin can give a coating composition for an aqueous paint.

BEST MODE FOR CARRYING OUT THE INVENTION

The aqueous-dispersing composition of synthetic resin of the present invention comprises the aqueous dispersion of synthetic resin and the above-mentioned condensate (I) of tetrafunctional silicate compound.

The condensate (I) of tetrafunctional silicate compound functions to give a property for preventing adherence of stains and weather resistance to a coating film formed by using the aqueous-dispersing composition or coating composition of the present invention.

In the present invention, R in the silicate condensate (I) represents $R^1$ and $R^2$. $R^1$ are methyl or ethyl or the both of them. From the viewpoint of stability in water, ethyl is preferred. $R^2$ is at least one alkyl having 3 to 10 carbon atoms, for example, propyl, isopropyl, buty, pentyl, hexyl and heptyl. Particularly propyl or butyl or the both of them are preferred from the viewpoint of good affinity for a synthetic resin, particularly a fluorine-containing resin. As the number of carbon atoms of an alkyl group $R^2$ increases, an affinity for a synthetic resin is lowered, thereby separating the aqueous-dispersing composition into two phases and causing cissing at coating.

$R^1$ solely contributes to hydrophilization of a coating film by hydrolization of —$OR^1$, and exhibits an effect of preventing adherence of stains. However when R consists of $R^1$, a large amount of hydrolization of silicate condensate (I) occurs in the aqueous-dispersing composition, which causes gelling and remarkably lowers storage stability of the aqueous-dispersing composition, and besides no —$OR^1$ group for preventing adherence of stains on a coating film remain in the composition. Particularly when pH of the aqueous dispersion deviates toward acid or alkali side, such a tendency appears remarkably.

$R^2$ functions to enhance storage stability in the aqueous dispersion of synthetic resin. However when R consists of $R^2$, an affinity for a resin is lowered and dispersibility in the aqueous-dispersing composition becomes very poor, which causes separation of the composition into two phases or easily causes cissing at coating. Thus good appearance of a coating film is difficult to obtain. It is a matter of course that an ability of preventing adherence of stains is hardly exhibited.

Therefore in the present invention, $R^1$ is contained in the whole R of the silicate condensate (I) in an amount of 5 to 98% by mole ($R^2$ is from 95 to 2% by mole), preferably 50 to 98% by mole ($R^2$ is from 50 to 2% by mole). When $R^1$ is less than 5% by mole, an effect of improving stain-proofing property is not obtained, and when exceeding 98% by mole, a gloss of a coating film tends to be lowered.

An average degree of condensation n is from 2 to 15, preferably from 4 to 10. When n is less than 2, namely when an amount of silicate compound of n=1 is large, since the silicate compound is easily evaporated, it is evaporated when drying a coating film, and thus a desired ability of preventing adherence of stains cannot be obtained. On the other hand, when n exceeds 10, appearance of an obtained coating film is lowered.

Represented examples of a method for preparing the condensate (I) of tetrafunctional silicate compound are the following two methods.

① A method for condensing tetramethoxysilane, tetraethoxysilane or a mixture thereof in the presence of an acid or a base and then substituting a part (2 to 95% by mole) of its alkyl (methyl and/or ethyl) with an alcohol having a linear or branched alkyl $R^2$ of C3 to C10 to introduce $R^2$:

Examples of tetramethoxysilane are, for instance, METHYL SILICATE 39 available from Colcoat Co., Ltd., and the like, examples of tetraethoxysilane are ETHYL SILICATE 28 available from Colcoat Co., Ltd., and the like, examples of the acid are sulfuric acid, hydrochloric acid, and the like, examples of the base are triethanolamine, and the like, and examples of the alcohol of C3 to C10 are propanol, butanol, hexanol, octanol, 2-ethylhexyl alcohol, and the like.

METHYL SILICATE 51 (n=5) commercially available from Colcoat Co., Ltd. as the condensate of tetramethoxysilane, or ETHYL SILICATE 40 (n=4), ETHYL SILICATE 45 (n=8) or ETHYL SILICATE 48 (n≧10) commercially available from Colcoat Co., Ltd. as the condensate of tetraethoxysilane may be alkyl-substituted by reacting with the above-mentioned alcohol of C3 to C10.

The alkyl-substitution reaction with alcohol may be carried out at a temperature around a boiling point of alcohol in the presence of the above-mentioned acid or base.

② A method for co-condensing by heating tetramethoxysilane, tetraethoxysilane or a mixture thereof and one or two or more of tetraalkoxysilane having a linear or branched alkyl $R^2$ of C3 to C10 in the presence of an acid or base:

Examples of tetramethoxysilane, tetraethoxysilane, acid and base are those used in ② above. Examples of tetraalkoxysilane of C3 to C10 are, for instance, propyl silicate and butyl silicate available from Colcoat Co., Ltd., and the like.

A proportion of $R^1$ to $R^2$ may be adjusted by an amount of tetraalkoxysilane to be used.

Non-restricted examples of the synthetic resin in the aqueous dispersion of synthetic resin to which the condensate (I) of tetrafunctional silicate compound is added are known synthetic resins, for instance, a fluorine-containing resin, acrylic resin, silicon-modified acrylic resin, urethane resin, melamine resin, silicone resin, epoxy resin, polyester, and the like. Among them, from the viewpoint of weather resistance and chemical resistance, a fluorine-containing resin is preferred. Also from the viewpoint of a property for preventing adherence of stains, a silicon-modified acrylic resin is preferred.

When the synthetic resin is a fluorine-containing resin, fluoroolefins having about 2 to 4 carbon atoms, for example, vinyl fluoride, vinylidene fluoride (VdF), tetrafluoroethylene (TFE), chlorotrifluoroethylene (CTFE), hexafluoropropylene (HFP), trifluoroethylene, and the like can be used.

Examples of the polymer of the above-mentioned fluoroolefin are, for instance, homopolymers of the above-mentioned fluoroolefins and known copolymers of two or more fluoroolefins. There are homopolymers of VdF, TFE and CTFE, VdF/TFE copolymer, VdF/HFP copolymer, VdF/CTFE copolymer, VdF/TFE/CTFE copolymer, VdF/TFE/HFP copolymer and TFE/HFP copolymer.

Aqueous dispersions of particles of those fluoroolefin polymers are prepared by usual emulsion polymerization. Namely the aqueous dispersions can be obtained by emulsion-polymerizing a fluoroolefin monomer or a mixture of fluoroolefin monomers in the presence of an emulsifying agent of not more than 5% by weight, preferably not more than 1% by weight on the basis of water.

It is preferable that water to be used in the emulsion polymerization is de-ionized water. Also it is preferable that the emulsifying agent is a fluorine-containing surfactant. Further a reactive fluorine-containing emulsifying agent can also be used. Also a slight amount of non-fluorine-containing nonionic emulsifying agent can be used together with the above-mentioned emulsifying agent.

The fluorine-containing emulsifying agent means a compound containing a fluorine atom in its structure and having a surface-activating ability or a mixture of two or more thereof. Examples of the compound are, for instance, an acid represented by $X(CF_2)_n COOH$, in which n is an integer of 6 to 20, X is F or H, its metal salt, ammonium salt, amine salt or quaternary ammonium salt; an acid represented by $Y(CH_2CF_2)_m COOH$, in which m is an integer of 6 to 13, Y is F or Cl, its metal salt, ammonium salt, amine salt or quaternary ammonium salt; and the like. In addition, it is possible to use a reactive emulsifying agent disclosed in JP-A-8-67795 solely or in combination with the above-mentioned fluorine-containing emulsifying agent. Also it is possible to use a non-fluorine-containing nonionic emulsifying agent disclosed in JP-A-7-90153 together.

Other examples of the fluoroolefin polymer are, for instance, copolymers of a fluoroolefin and a non-fluorine-containing monomer.

As the monomers being copolymerizable with the above-mentioned fluoroolefins, there are, for example, α-olefins such as ethylene, propylene and isobutylene; vinyl ethers such as ethyl vinyl ether (EVE), cyclohexyl vinyl ether (CHVE), hydroxybutyl vinyl ether (HBVE), butyl vinyl ether, isobutyl vinyl ether, methyl vinyl ether and polyoxyethylene vinyl ether; alkenyls such as polyoxyethylene allyl ether, ethyl allyl ether, hydroxyethyl allyl ether, allyl alcohol and allyl ether; vinyl esters such as vinyl acetate, vinyl lactate, vinyl butyrate, vinyl pivalate, vinyl benzoate, and VEOVA9 and VEOVA10 (brand names of Shell Chemical Co., Ltd.); ethylenically unsaturated carboxylic acids such as itaconic anhydride, succinic anhydride and crotonic acid; and the like. Particularly α-olefins, vinyl ethers, vinyl esters and alkenyls are used preferably.

Examples of the above-mentioned copolymers are TFE/propylene copolymer, TFE/ethylene copolymer, TFE/vinyl ester copolymer, TFE/vinyl ether copolymer, HFP/vinyl ether copolymer, HFP/vinyl ester copolymer, CTFE/vinyl ether copolymer, and the like. Further there are copolymers comprising three or more monomers, which contain, in addition to the above-mentioned copolymer, a monomer copolymerizable with the above-mentioned fluoroolefin as a modified monomer in an amount of not more than 30% by mole.

The aqueous dispersions of particles of those fluoroolefin copolymers are prepared by usual emulsion polymerization. A process for emulsion polymerization may be the same as the above-mentioned process for polymerization of the fluoroolefin polymer except that a mixture of a fluoroolefin and a monomer copolymerizable with the fluoroolefin is used.

It is preferable that the fluoroolefin monomer is contained in an amount of 20 to 80% by mole in the copolymer of the mentioned fluoroolefin and non-fluorine-containing monomer. When the content of the fluoroolefin monomer is less than 20% by mole, there is a tendency that weather resistance is not exhibited sufficiently, and when more than 80% by mole, there is a tendency that when a coating is made and a coating film is formed, appearance is lowered.

A fluorine-containing seed polymer prepared by seed-polymerizing a non-fluorine-containing monomer having a reactive α,β-unsaturated group in an aqueous dispersion in the presence of particles of fluorine-containing polymer can also be used as the fluorine-containing resin.

Examples of the fluorine-containing polymer are fluorine-containing resins mentioned above.

Examples of the non-fluorine-containing monomer to be seed-polymerized to the fluorine-containing polymer are non-fluorine-containing acrylic monomers or non-fluorine-containing acrylic silicon monomers. Examples of the acrylic monomer are reactive α,β-unsaturated monomers such as alkyl acrylates having an alkyl group of C1 to C18 and alkyl methacrylates having an alkyl group of C1 to C18, and monomers being copolymerizable therewith and having an ethylenically unsaturated unit.

Examples of the alkyl acrylates having an alkyl group of C1 to C18 are, for instance, methyl acrylate, ethyl acrylate, propyl acrylate, n-butyl acrylate, isobutyl acrylate, 2-ethylhexyl acrylate, lauryl acrylate, and the like.

Examples of the alkyl methacrylates having an alkyl group of C1 to C18 are, for instance, methyl methacrylate, ethyl methacrylate, propyl methacrylate, n-propyl methacrylate, isobutyl methacrylate, cyclohexyl methacrylate, lauryl methacrylate, and the like.

Also for the purpose to enhance solvent resistance and water resistance, it is possible to copolymerize a polyfunctional monomer such as ethylene glycol dimethacrylate or propylene glycol dimethacrylate.

Examples of the monomer having an ethylenically unsaturated unit and being copolymerizable with the acrylic ester and/or methacrylic ester are, for instance, α-olefins such as ethylene, propylene and isobutylene; vinyl ethers such as ethyl vinyl ether (EVE), cyclohexyl vinyl ether (CHVE), hydroxy butyl vinyl ether (HBVE), butyl vinyl ether, isobutyl vinyl ether, methyl vinyl ether and polyoxyethylene vinyl ether; alkenyls such as polyoxyethylene allyl ether, ethyl allyl ether, hydroxyethyl allyl ether, allyl alcohol and allyl ether; vinyl esters such as vinyl acetate, vinyl lactate, vinyl butyrate, vinyl pivalate, vinyl benzoate, and VEOVA9 and VEOVA 10 (brand names available from Shell Chemical Co., Ltd.); ethylenically unsaturated carboxylic acids such as itaconic anhydride, succinic anhydride and crotonic acid; aromatic vinyl compounds such as styrene, α-methylstyrene and p-tert-butylstyrene; acrylonitrile; and the like.

Examples of the silicon-modified acrylic monomer are mixtures of the above-mentioned acrylic monomer and a monomer represented hereinafter by the formula (II) as a monomer for the above-mentioned synthetic resin. Particularly preferred are those containing γ-methacryloyloxytrimethoxysilane, γ-methacryloyloxymethyldimethoxysilane, γ-methacryloyloxytriethoxysilane or γ-methacryloyloxymethyldiethoxysilane.

It is preferable that the non-fluorine-containing monomer is contained in the obtained seed-polymer in an amount of from 0.1 to 20% by weight, particularly from 1 to 10% by weight. When the content of the non-fluorine-containing monomer decreases, an effect on improvement in stain-proofing property and stain removable property tends to be lowered, and when the content increases, appearance of a coating film tends to be poor. Also it is preferable that a weight average molecular weight of the seed polymer obtained by seed-polymerizing the non-fluorine-containing monomer is not less than 10,000, preferably from 10,000 to 1,000,000.

It is preferable that a content of the fluoroolefin monomer is from 20 to 90% by mole on the basis of the whole seed polymer. When the content of the fluoroolefin monomer is less than 20% by mole, there is a tendency that weather resistance is not exhibited sufficiently, and when more than 90% by mole, at the time of making a coating and forming a coating film, its appearance tends to be lowered.

The seed polymerization of the non-fluorine-containing monomer can be carried out under the same conditions as in usual emulsion polymerization. For example, a surfactant, a polymerization initiator, a chain transfer agent and as case demands, a chelating agent, a pH control agent, a solvent, etc. are added to water medium containing particles of the fluorine-containing polymer and then polymerization reaction of the monomer is conducted at about 20° C. to about 90° C. for about 0.5 hour to about 6 hours.

When the non-fluorine-containing monomer is emulsion-polymerized in the presence of particles of the fluorine-containing polymer, it seems that at first, there occurs swelling of the particles of the fluorine-containing polymer with the non-fluorine-containing monomer and at that time, the mixture becomes in the state of an aqueous dispersion of the fluorine-containing polymer dissolved uniformly in the monomer, and then the monomer is polymerized by adding an initiator, to form the seed polymer, thus forming single phase polymer blend particles, in which the molecular chains of the fluorine-containing polymer and non-fluorine-containing polymer are entangled with each other.

As a surfactant, there is used an anionic surfactant, nonionic surfactant or combination of the anionic and nonionic surfactants, and as case demands, an amphoteric surfactant can be used.

Examples of the anionic surfactant are a sulfate of higher alcohol, sodium alkylsulfonate, sodium alkylbenzenesulfonate, sodium dialkylsulfosuccinate, sodium alkyldiphenylether disulfonate, and the like. Examples of the nonionic surfactant are polyoxyethylene alkyl ethers, polyoxyethylene alkyl phenyl ethers, polyoxyethylene alkyl esters, polyoxyethylene alkyl phenyl esters, sorbitan alkyl esters, glycerol esters, their derivatives, and the like.

As the amphoteric surfactant, there are lauryl betaine, and the like. Further a so-called reactive emulsifying agent which is copolymerizable with the ethylenically unsaturated monomer can be used.

Examples of commercially available reactive emulsifying agent are Blemmar PE-350, Blemmar PME-400 and Blemmar 70PEP350B (available from NOF Corporation); NK Ester M-40G, NK Ester M-90G and NK Ester M-230G (available from Shin-Nakamura Kagaku Kabushiki Kaisha); RMA450M (available from Nippon Nyukazai Kabushiki Kaisha); Aquaron HS10, Aquaron HS20, Aquaron HS1025, Aquaron RN10, Aquaron RN20, Aquaron RN30, Aquaron RN50 and Aquaron RN2025 (available from Dai-ichi Kogyo Seiyaku Kabushiki Kaisha); NK Ester AMP-60G, NK Ester CB-1, NK Ester SA and NK Ester A-SA; Eleminol JS2 and Eleminol RS30 (available from Sanyo Kasei Kogyo Kabushiki Kaisha); Latemle WX (available from Kao Corporation); and the like.

An amount of the surfactant is usually from about 0.05 part by weight to about 5.0 parts by weight on the basis of 100 parts by weight of the ethylenically unsaturated monomer.

The initiator is not particularly limited as far as a radical which can be used for free radical polymerization in aqueous medium is produced at 20° to 90° C. As case demands, the initiator can be used in combination with a reducing agent. Examples of the water-soluble initiator are, for instance, a persulfate, hydrogen peroxide, 2,2-azobis(2- amidinopropane) hydrochloride (AIBA) and the like, and examples of the reducing agent are sodium pyrosulfite, sodium hydrogensulfite, sodium L-ascorbate, and the like. Examples of the oil-soluble initiator are diisopropylperoxydicarbonate (IPP), benzoyl peroxide, dibutyl peroxide, azobisisobutyronitrile (AIBN), and the like. An amount of the initiator is usually from about 0.05 part by weight to about 2.0 parts by weight on the basis of 100 parts by weight of the ethylenically unsaturated monomer.

A polymerization temperature may be from 20° to 90° C.

Examples of the chain transfer agent are halogenated hydrocarbons (for example, chloroform, carbon tetrachloride, and the like), mercaptans (for example, n-dodecyl mercaptan, t-dodecyl mercaptan, and n-octyl mercaptan) and the like. An amount of the chain transfer agent is usually from 0 to about 5.0 parts by weight on the basis of 100 parts by weight of the ethylenically unsaturated monomer.

As the solvent, there may be used methyl ethyl ketone, acetone, trichlorotrifluoroethane, methyl isobutyl ketone, cyclohexanone, ethyl acetate, or the like in such a small amount as not lowering workability, safety against disaster, safety in environment and safety in production. By adding the solvent, there is a case where swelling property of the non-fluorine-containing monomer into the particles of the fluorine-containing polymer for seed polymerization is improved.

The seed polymerization can be carried out by known method, for example, a method of charging the whole amount of non-fluorine-containing monomer in one lot in a reaction system in the presence of particles of the fluorine-containing polymer, a method of charging a part of the non-fluorine-containing monomer for the reaction and then charging the remaining monomer continuously or dividedly or a method of charging the whole amount of non-fluorine-containing monomer continuously. Also the non-fluorine-containing monomer can be seed-polymerized in an aqueous dispersion in the presence of two or more fluorine-containing polymers.

Examples of the synthetic resin other than the fluorine-containing resin are those disclosed in JP-A-8-259892, and the like.

For example, there are polymers prepared by using the following vinyl monomers.

Examples thereof are, for instance, vinyl monomers such as methyl (meth)acrylate, ethyl (meth)acrylate, butyl (meth)acrylate, isobutyl (meth)acrylate, benzyl (meth)acrylate and cyclohexyl (meth)acrylate; aromatic hydrocarbon type vinyl monomers such as styrene, α-methylstyrene, chlorostyrene, 4-hydroxystyrene and vinyltoluene; polymerizable acids having carbon-carbon double bond such as α,β-ethylenically unsaturated carboxylic acids e.g. acrylic acid, methacrylic acid, maleic acid, maleic anhydride, itaconic acid, itaconic anhydride, crotonic acid, fumaric acid and citraconic acid, styrenesulfonate, vinylsulfonate, etc.; or salts thereof (alkali metal salt, ammonium salt, amine salt, and the like); acid anhydrides such as maleic anhydride or half esters of acid anhydride with a linear or branched alcohol having 1 to 20 carbon atoms; (meth)acrylates having an amino group such as dimethylaminoethyl (meth)acrylate, dimethylaminopropyl (meth)acrylate and diethylaminoethyl (meth)acrylate; (meth)acrylamide, α-ethyl (meth)acrylamide, N-buthoxymethyl (meth)acrylamide, N,N-dimethyl acrylamide, N-methyl acrylamide, acryloyl morpholine or hydrochloric acid salt or acetic acid salt thereof; vinyl esters such as vinyl acetate, vinyl propionate and diallyl phthalate and allyl compounds; vinyl monomers having a nitrile group such as (meth)acrylonitrile; vinyl monomers having an epoxy group such as glycidyl (meth)acrylate; hydroxyl-containing vinyl monomers such as 2-hydroxyethyl (meth)acrylate, 2-hydroxypropyl (meth)acrylate, 2-hydroxyethyl vinyl ether, N-methylol (meth)acrylamide, hydroxystyrene and hydroxyl-containing vinyl type modified hydroxyalkyl vinyl monomer; vinyl compounds such as hydroxyalkyl esters of α,β-ethylenically unsaturated carboxylic acid such as hydroxyalkyl ester of (meth)acrylic acid, vinyl compounds such as phosphate group containing vinyl compound, or (meth)acrylates having urethane bond or siloxane bond; and other vinyl monomers such as vinyl methyl ether, vinyl chloride, vinylidene chloride, chloroprene, propylene, butadiene and N-vinyl imidazole.

Also there can be used monomers which have a silyl group and are represented by the formula (II):

$$X^1{}_{3-a}SiR^3{}_a \qquad (II)$$

Examples thereof are, for instance, $CH_2$=$CHSi(OCH_3)_3$, $CH_2$=$CHSi(OCH_3)_2$
           $\quad\;\;|$
           $\;\;\;CH_3$ $CH_2$=$C(CH_3)Si(OCH_3)_3$, $CH_2$=$C(CH_3)Si(OCH_3)_2$,
                  $\quad\;\;|$
                  $\;\;\;CH_3$ $CH_2$=$CHSi(OC_2H_6)_3$, $CH_2$=$CHSi(OC_3H_7)_3$, $CH_2$=$CHSi(OC_4H_9)_3$, $CH_2$=$CHSi(OC_6H_{13})_3$, $CH_2$=$CHSi(OC_8H_{17})_3$, $CH_2$=$CHSi(OC_{10}H_{21})_3$, $CH_2$=$CHSi(OC_{21}H_{25})_3$, $CH_2$=$CHCOO(CH_2)_3Si(OCH_3)_3$, $CH_2$=$CHCOO(CH_2)_3Si(OCH_3)_2$,
                         $\quad\;\;|$
                         $\;\;\;CH_3$ $CH_2$=$C(CH_3)COO(CH_2)_3Si(OCH_3)_3$, $CH_2$=$C(CH_3)COO(CH_2)_3Si(OCH_3)_2$,
                              $\quad\;\;|$
                              $\;\;\;CH_3$ $CH_2$=$CHCOO(CH_2)_3Si(OC_2H_5)_3$, $CH_2$=$CHCOO(CH_2)_3Si(OC_2H_5)_2$,
                         $\quad\;\;|$
                         $\;\;\;CH_3$ $CH_2$=$C(CH_3)COO(CH_2)_3Si(OC_2H_5)_3$, $CH_2$=$C(CH_3)COO(CH_2)_3Si(OC_2H_5)_2$,
                              $\quad\;\;|$
                              $\;\;\;CH_3$ $CH_2$=$C(CH_3)COO(CH_2)_2O(CH_2)_3Si(OCH_3)_3$, $CH_2$=$C(CH_3)COO(CH_2)_2O(CH_2)_3Si(OCH_3)_2$,
                                       $\quad\;\;|$
                                       $\;\;\;CH_3$ $CH_2$=$C(CH_3)COO(CH_2)_{11}Si(OCH_3)_3$, $CH_2$=$C(CH_3)COO(CH_2)_{11}Si(OCH_3)_2$,
                             $\quad\;\;|$
                             $\;\;\;CH_3$ $CH_2$=$CHCH_2OCO(ort-C_6H_4)COO(CH_2)_3Si(OCH_3)_3$ $CH_2$=$CHCH_2OCO(ort-C_6H_4)COO(CH_2)_3Si(OCH_3)_2$
                                              $\quad\;\;|$
                                              $\;\;\;CH_3$ -continued

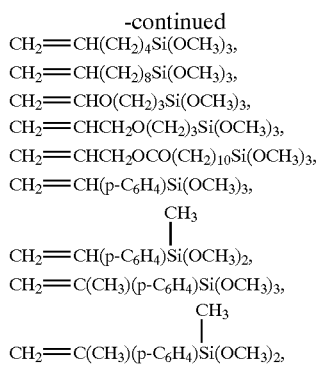

and the like. Among them, particularly monomers having alkoxysilyl group are preferred from the viewpoint of stability.

Those silyl group-containing vinyl monomers may be used solely or in a mixture of two or more thereof. It is preferable that those monomers are copolymerized in an amount of 1 to 50% by weight, further preferably 2 to 30% by weight. When the amount is less than 1% by weight, water resistance and weather resistance are poor, and when more than 50% by weight, stability of emulsion is lowered and storage stability is lowered.

In order to obtain a resin having urethane bond, the urethane bond is introduced into a copolymer by reacting an isocyanate compound with a hydroxyl-containing monomer. In order to obtain a crosslinked resin with urethane bond, a vinyl polymer having free isocyanate group and/or block isocyanate group may be mixed and reacted with a vinyl polymer having hydroxyl group, and thus crosslinking with urethane is carried out. The isocyanate compounds are those having two isocyanate groups in a molecule thereof, for example, aliphatic, aromatic and alicyclic diisocyanate compounds such as tolylene diisocyanate, 4,4'-diphenylmethane diisocyanate, xylene diisocyanate, hexamethylene diisocyanate, lysine diisocyanate, 4,4'-methylenebis (cyclohexyl isocyanate), mthylcyclohexane-2,4(2,6)-diisocyanate, isophorone diisocyanate and trimethylhexane diisocyanate and reaction products of those isocyanate compounds with a polyether resin, polyester resin or polycarbonate resin which has two or more hydroxyl groups in its molecule. The isocyanate-containing monomer may be prepared by reacting the above-mentioned diisocyanate compounds with the mentioned hydroxyl-containing monomer. For example, preferred are adducts of isophorone diisocyanate with 2-isocyanate ethyl methacrylate, m-isopropenyl-α,α'-dimethyl benzyl isocyanate or 2-hydroxyethyl methacrylate in equimolar amounts.

Examples of the vinyl monomer having a carbonyl group are, for instance, acrolein, diacetone acrylamide, formylstyrol, preferably vinyl alkyl ketone having 4 to 7 carbon atoms (for example, vinyl methyl ketone, vinyl ethyl ketone, vinyl isobutyl ketone, and the like), diacetone acrylate, acetonyl acrylate, diacetone methacrylate, 2-hydroxypropyl acrylate-acetylacetate, butanediol-1,4-acrylate-acetylacetate, and the like. Those carbonyl-containing vinyl monomers may be used solely or in a mixture of two or more thereof. An amount of the carbonyl-containing vinyl monomer is from 0.1 to 30 parts by weight, preferably from 3 to 10 parts by weight on the basis of the whole monomers.

As a compound having hydrazine or hydrazyl group which is reacted with the carbonyl-containing polymer, preferred are hydrazine derivatives having at least two hydrazine residues in a molecule thereof. Examples thereof are dihydrazide dicarbonates which are dehydrated condensates of hydrazine and dicarboxylic acids having 2 to 10, preferably 4 to 6 carbon atoms (for example, dihydrazide oxalate, dihydrazide malonate, dihydrazide succinate, dihydrazide glutamate, dihydrazide adipate, dihydrazide sebacate, dihydrazide maleate, dihydrazide fumarate, dihydrazide itaconate, and the like); and water soluble aliphatic dihydrazines having 2 to 4 carbon atoms (for example, ethylene-1,2-dihydrazine, propylene-1,3-dihydazine, butylene-1,4-dihydrazine, and the like).

Those synthetic resins form an aqueous dispersion in the form of particles. An average particle size of the synthetic resin particles is from 50 to 300 nm, preferably from 100 to 200 nm from the viewpoint of stability and viscosity of the aqueous dispersion. A concentration of the dispersion varies depending on kind of synthetic resin and may be usually selected optionally in the range of from 20 to 70% by weight, preferably from 30 to 60% by weight.

The aqueous dispersion of the synthetic resin can be usually prepared by the above-mentioned emulsion polymerization method, and in addition, a suspension polymerization method, in which a monomer is polymerized in an aqueous medium in the presence of a dispersion stabilizing agent; or a phase change method, in which a polymer obtained by polymerizing a monomer in an organic solvent is phase-converted and dispersed in water. Among them, emulsion polymerization method is preferably adopted from the viewpoint of stability of dispersion.

The aqueous-dispersing composition of synthetic resin of the present invention can be prepared by mixing the above-mentioned aqueous dispersion of synthetic resin with the above-mentioned condensate (I) of tetrafunctional silicate compound. The silicate condensate (I) is mixed in an amount of 1 to 100 parts by weight (hereinafter referred to as "part") on the basis of 100 parts of solid content in the aqueous dispersion of synthetic resin. When less than 1 part, intended enhancement of a property of preventing adherence of stains is not recognized, and when exceeding 100 parts, it results in lowering of flexibility and appearance. Preferred is from 5 to 50 parts.

The mixing of the aqueous dispersion of synthetic resin with the silicate condensate (I) is carried out by a method of directly adding the silicate condensate (I) to the aqueous dispersion of synthetic resin and then mixing; a method of forcedly emulsifying the silicate condensate (I) together with an aqueous solution of emulsifying agent by stirring strongly with a homogenizer or the like and then admixing the obtained emulsion to the aqueous dispersion of synthetic resin; a method of mixing the silicate condensate (I) with a film forming aid and then admixing the mixture to the aqueous dispersion of synthetic resin, and the like method.

The aqueous-dispersing composition of synthetic resin of the present invention is useful as a coating composition for aqueous paint as it is or by adding optional additives for paint.

The present invention relates to the coating composition for aqueous paint which contains the above-mentioned aqueous-dispersing composition of synthetic resin.

Also various coating compositions for aqueous paint can be prepared by adding various additives usually used in the field of paint.

The coating composition of the present invention can be used, for example, in the form of aqueous paint as a surface protective coating for an inorganic substrate such as concrete, slate or ALC plate and a metallic substrate and further as a coating material for coated paper by adding additives such as a pigment, thickener, dispersing agent, anti-foaming agent, anti-freezing agent, film forming aid, ultraviolet ray absorbing agent and antioxidant which are generally used for aqueous emulsion paints. Also the coating composition can be used as a coating for patterning by adding thereto natural stone, synthetic resin beads, etc. for flatting.

Further the coating composition can be used as an aqueous paint for exterior and/or interior of medium- and low-storied building.

For application as a paint, a solid content of the aqueous-dispersing composition of the present invention may be adjusted so as to be from about 5% by weight to about 95% by weight, usually from 20 to 90% by weight on the basis of the paint though it varies depending on a form of paint, coating method, etc.

For application of the paint, known application methods can be employed. In the application, known coating apparatuses such as brush, roller, roll coater, air sprayer, airless sprayer, electrostatic coating machine, dip coater and electrocoating machine can be used.

The above-mentioned aqueous paint can be applied to various substrates, i.e. not only metals such as iron, aluminum, copper and alloys thereof but also inorganic materials such as glass, cement and concrete, resins such as FRP, acrylic resin, vinyl chloride resin, polycarbonate resin and polyurethane resin, wood and fiber. Also if necessary, a substrate may be subjected to pre-coating or surface treating with an under coating such as a known aqueous resin emulsion paint or a solvent type paint. The coating composition of the present invention can be applied after optionally carrying out under-coating or pre-coating. The coating system can be applied as a clear coating or enamel coating on various known substrates having uneven surface patterns and color patterns After the application, a coating film is usually dried for curing at 5° to 300° C. for 30 seconds to one week. A coating thickness is not particularly limited, and is usually from 1 to 200 $\mu$m, preferably from 5 to 100 $\mu$m, more preferably from 10 to 50 $\mu$m.

The present invention also relates to the so-obtained coated article.

Since the coated article of the present invention is excellent in adhesion, weather resistance and chemical resistance and a surface of the coating film has a gloss, lubricity and hardness, the article can be used in a wide range of applications. Namely there are wide applications for coating of interior and exterior of electric appliances (electronic range, toaster, refrigerator, washing machine, hair dryer, television set, videocassette recorder, amplifier, radio, electric pot, rice cooker, radio with cassette recorder, cassette deck, compact disk player, video camera, etc.); interior and exterior of air conditioner such as indoor unit, outdoor unit, louver, duct, air cleaner and heater); illumination apparatuses such as fluorescent lamp, chandelier and reflection plate; furniture; machine parts; decorations; comb; frame of glasses; natural fiber; synthetic fiber (in the form of yarn or woven fabric obtained therefrom); interior and exterior of office machine (phone, facsimile machine, copying machine (including rollers), camera, overhead projector, prototype projector, clock, slide projector, desk, bookshelf, locker, shelf for documents, chair, bookends and electronic whiteboard); car-related parts (wheel, door mirror, lace, door handle, number plate, handle and instrument panel); cooking utensils (range hood, sink, cooking panel, cooking knife, chopping board, water tap, gas range and ventilator); for indoor coating of partition plate, bath unit, shutter, blind, curtain rail, accordion curtain, wall, ceiling and floor; and for outdoor coating of housing such as wall, handrail, door and shutter, and for outdoor coating of building such as sizing material of ceramic, foamed concrete panel, concrete panel, aluminum curtain wall, steel plate, galvanized steel plate, stainless steel plate and vinyl chloride sheet; window glass; and the like.

The present invention is then explained by means of preparation examples and examples and comparative examples, but is not limited to them.

PREPARATION EXAMPLE 1

(Preparation of condensate (I) of tetrafunctional silicate compound)

A 500-ml four-necked flask provided with a stirrer and reflux tube was charged with 100 g of ETHYL SILICATE 48 ($n \geq 10$ in the formula (I), available from Colcoat Co., Ltd.) and 100 g of n-propyl alcohol (nPA). After heating up to 80° C., further 2 g of sulfuric acid was added, followed by stirring with refluxing for two hours. Then volatile components were distilled off under reduced pressure to terminate a reaction. The obtained silicate condensate (I) was prepared into a 0.5% by weight of THF solution and a molecular weight converted based on styrene was measured by using THF as a developing solution with a GPC column TSKgelG1000H$_{XL}$ (available from Toso Kabushiki Kaisa) and a detector RI at a velocity of 1 ml/min. As a result, a weight average molecular weight Mw was 2800. A proportion of ethyl in the silicate condensate (I) which was measured with Proton NMR was 7% by mole.

PREPARATION EXAMPLES 2 to 8

Silicate condensates (I) of Preparation Examples 2 to 8 were prepared in the same manner as in Preparation Example 1 except that starting materials and reaction conditions as shown in Table 1 were changed. The results of analysis are shown in Table 1. In Table 1, nPA, nBA, OA, 2EHA and LA are abbreviations of n-propyl alcohol, n-butyl alcohol, octyl alcohol, 2-ethylhexyl alcohol and lauryl alcohol, respectively.

TABLE 1

| | Preparation Example | | | | | | | |
|---|---|---|---|---|---|---|---|---|
| | 1 | 2 | 3 | 4 | 5 | 6 | 7 | 8 |
| Starting materials (g) | | | | | | | | |
| ETHYL SILICATE 48 | 100 | 100 | 100 | 100 | 100 | 100 | 100 | 100 |
| Alcohol | | | | | | | | |
| nPA ($R^2 = C_3$) | 100 | 55 | 6 | 3 | — | — | — | — |
| nBA ($R^2 = C_4$) | — | — | — | — | 10 | — | — | — |
| OA ($R^2 = C_8$) | — | — | — | — | — | 18 | — | — |

TABLE 1-continued

|  | Preparation Example | | | | | | | |
|---|---|---|---|---|---|---|---|---|
|  | 1 | 2 | 3 | 4 | 5 | 6 | 7 | 8 |
| 2EHA ($R^2 = C_8$) | — | — | — | — | — | — | 18 | — |
| LA ($R^2 = C_{12}$) | — | — | — | — | — | — | — | 25 |
| Reaction conditions | | | | | | | | |
| Reaction temperature (° C.) | 80 | 80 | 80 | 80 | 100 | 120 | 120 | 140 |
| Reaction time (hr) | 2 | 2 | 1 | 1 | 1 | 1 | 1 | 1 |
| Physical properties | | | | | | | | |
| Mw | 1760 | 1730 | 1700 | 1690 | 1710 | 1730 | 1750 | 1800 |
| Content of ethyl (% by mole) | 7 | 52 | 95 | 99 | 97 | 94 | 94 | 95 |

EXAMPLE 1

ZEFFLE SE310 white paint available from DAIKIN INDUSTRIES, LTD. (aqueous emulsion of vinylidene fluoride resin/acrylic resin seed polymer, pH: 7, solid content: 51%) was used as a base emulsion.

5.3 Parts of SN5027 (available from SUNNOBCO CO., LTD.) as a dispersing agent, 0.4 part of FS013B (available from Dow Corning Co., Ltd.) as an anti-foaming agent, 4.0 parts of ethylene glycol and 70.0 parts of TIPEK CR97 (available from Ishihara Sangyo Kabushiki Kaisha) as a titanium oxide were dispersed in 10.0 parts of water with a sand mill to give a pigment paste. Subsequently 0.6 part of water was added to 68.2 parts of ZEFFLE SE310, and thereto were added 24.1 parts of pigment paste, 5.1 parts of diethyl adipate, 0.1 part of FS013B (available from Dow Corning Co., Ltd.) as an anti-foaming agent and 1.9 parts of 10% aqueous solution of ADECANOL UH420 (available from Asahi Denka Kogyo Kabushiki Kaisha) as a thickener, followed by stirring at 400 rpm for one hour to give a white paint. This white paint is referred to as SE310W. To 100 parts of SE310W was added 10 parts of silicate condensate (I) of Preparation Example 1, followed by stirring for 15 minutes to give a coating composition. With respect to this coating composition, the following items were measured.
(Initial characteristics of white coating film)

Gloss: The obtained paint was spread on a glass plate with a 10 mil applicator, and after drying at room temperature for one week, a gloss was measured with a gloss meter (available from Suga Shikenki Kabushiki Kaisha).

Storage stability: The obtained paint was put in a 50 ml glass screw bottle, and a viscosity thereof before and after storing at 50° C. in a constant temperature vessel for two weeks was measured with a Brookfield type viscometer. The results are classified as follows.

⊚: A change in viscosity of the paint is 80 to 150% of an initial viscosity.

○: A change in viscosity of the paint is more than 150% and less than 200% of an initial viscosity.

Δ: A change in viscosity of the paint is not less than 200% of an initial viscosity.

X: The paint agglomerates wholly.

It is considered that the paint stands under normal conditions in use in cases of the levels of ⊚ and ○. (Stain-proofing property of plate coated with white paint)

The paint after storage stability test was spread, with a 10 mil applicator, on an aluminum plate subjected to chemical conversion treatment, and drying was carried out at room temperature for one week to give a test piece. Then a stain-proofing property was determined. Stain-proofing property: Chromaticity coordinates were measured with a colorimeter (color-difference meter CR300 available from Minolta Co., Ltd.) before and after outdoor exposure by setting a coated plate on an exposure rack facing southward at an angle of 30 degrees in Settsu-shi, Osaka prefecture for one week and three months, respectively. A difference ΔL in brightness after the exposure was used as an index for staining. Smaller values indicate smaller amount of adhered stains.

EXAMPLES 2 to 9

The same procedures as in Example 1 were repeated except that kind and amount of the adding silicate condensate (I) as shown in Table 2 were changed, to give white paints of Examples 2 to 9 and evaluate coating films of the white paints. The results are shown in Table 2.

TABLE 2

|  | Example | | | | | | | | |
|---|---|---|---|---|---|---|---|---|---|
|  | 1 | 2 | 3 | 4 | 5 | 6 | 7 | 8 | 9 |
| Added silicate condensate | | | | | | | | | |
| Preparation Example No. | 1 | 2 | 3 | 3 | 3 | 4 | 5 | 6 | 7 |
| Adding amount (/hr)*1 | 30 | 30 | 3 | 30 | 92 | 30 | 30 | 30 | 30 |
| Initial characteristics of white coating film | | | | | | | | | |
| Gloss | 65 | 68 | 75 | 74 | 61 | 75 | 63 | 61 | 61 |
| Storage stability | ○ | ⊚ | ⊚ | ⊚ | ○ | ⊚ | ⊚ | ○ | ○ |
| Stain-proofing property of plate coated with white paint | | | | | | | | | |
| 1 week after | 4.6 | 4.1 | 4.8 | 2.3 | 1.9 | 2.1 | 2.7 | 4.3 | 4.7 |
| 3 months after | 9.6 | 4.9 | 7.8 | 1.9 | 1.7 | 1.8 | 4.6 | 7.1 | 8.9 |

*1: Part by weight on the basis of 100 parts by weight of solid content in aqueous dispersion of synthetic resin

COMPARATIVE EXAMPLES 1 to 5

The same procedures as in Example 1 were repeated except that kind and amount of adding silicate condensate (I) as shown in Table 3 were changed, to give white paints of Comparative Examples 1 to 5 and evaluate coating films of the white paints. The results are shown in Table 3.

In Table 3, Et48 and Pr are abbreviations of ETHYL SILICATE 48 available from Colcoat Co., Ltd. and propyl silicate available from Colcoat Co., Ltd., respectively.

TABLE 3

|  | Comparative Example | | | | |
|---|---|---|---|---|---|
|  | 1 | 2 | 3 | 4 | 5 |
| Added silicate condensate | | | | | |
| Preparation Example No. | Et48 | Pr | — | 3 | 8 |
| Adding amount (/hr)*1 | 30 | 30 | — | 110 | 30 |
| Initial characteristics of white coating film | | | | | |
| Gloss | 75 | Unmeasurable *2 | 75 | 48 | Unmeasurable *2 |
| Storage stability | Δ | ○ | ⊚ | Δ | ○ |
| Stain-proofing property of plate coated with white paint | | | | | |
| 1 week after | 5.2 | 5.3 | 5.3 | 2.3 | 5.5 |
| 3 months after | 13.4 | 14.3 | 13.7 | 4.8 | 10.2 |

*1: Part by weight on the basis of 100 parts by weight of solid content in aqueous dispersion of synthetic resin.
*2: Cissing occurred at coating and a coating film having a measurable gloss could not be obtained.

INDUSTRIAL APPLICABILITY

The aqueous-dispersing composition of synthetic resin of the present invention is excellent in stain-proofing property, weather resistance and storage stability, is capable of forming a coating film having a high gloss, and is useful as a coating composition for various paints.

What is claimed is:

1. An aqueous-dispersing composition of synthetic resin which comprises an aqueous dispersion of synthetic resin and a condensate of tetrafunctional silicate compound represented by the formula (I):

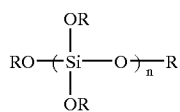

wherein R represents $R^1$ ($R^1$ is methyl and/or ethyl) and $R^2$ ($R^2$ is at least one linear or branched alkyl group having 3 to 10 carbon atoms), n is 2 to 15, and contains the condensate of tetrafunctional silicate compound in an amount of 1 to 100 parts by weight on the basis of 100 parts by weight of solid content in the aqueous dispersion of synthetic resin.

2. The aqueous-dispersing composition of claim 1, wherein a proportion of $R^1$ to all R is from 5 to 98% by mole.

3. The aqueous-dispersing composition of claim 1, wherein $R^2$ is propyl and/or butyl.

4. The aqueous-dispersing composition of claim 1, wherein the synthetic resin is a fluorine-containing resin.

5. A coating composition for paint which contains the aqueous-dispersing composition of claim 1.

6. A coating composition for paint which contains the aqueous-dispersing composition of claim 2.

7. A coating composition for paint which contains the aqueous-dispersing composition of claim 3.

8. A coating composition for paint which contains the aqueous-dispersing composition of claim 4.

9. An article coated with the coating composition for paint of claim 5.

10. An article coated with the coating composition for paint of claim 6.

11. An article coated with the coating composition for paint of claim 7.

12. An article coated with the coating composition for paint of claim 8.

* * * * *